May 11, 1954
J. N. STRAKY
2,678,025
VEHICLE BODY HANDLING EQUIPMENT
Filed June 15, 1950
3 Sheets-Sheet 1
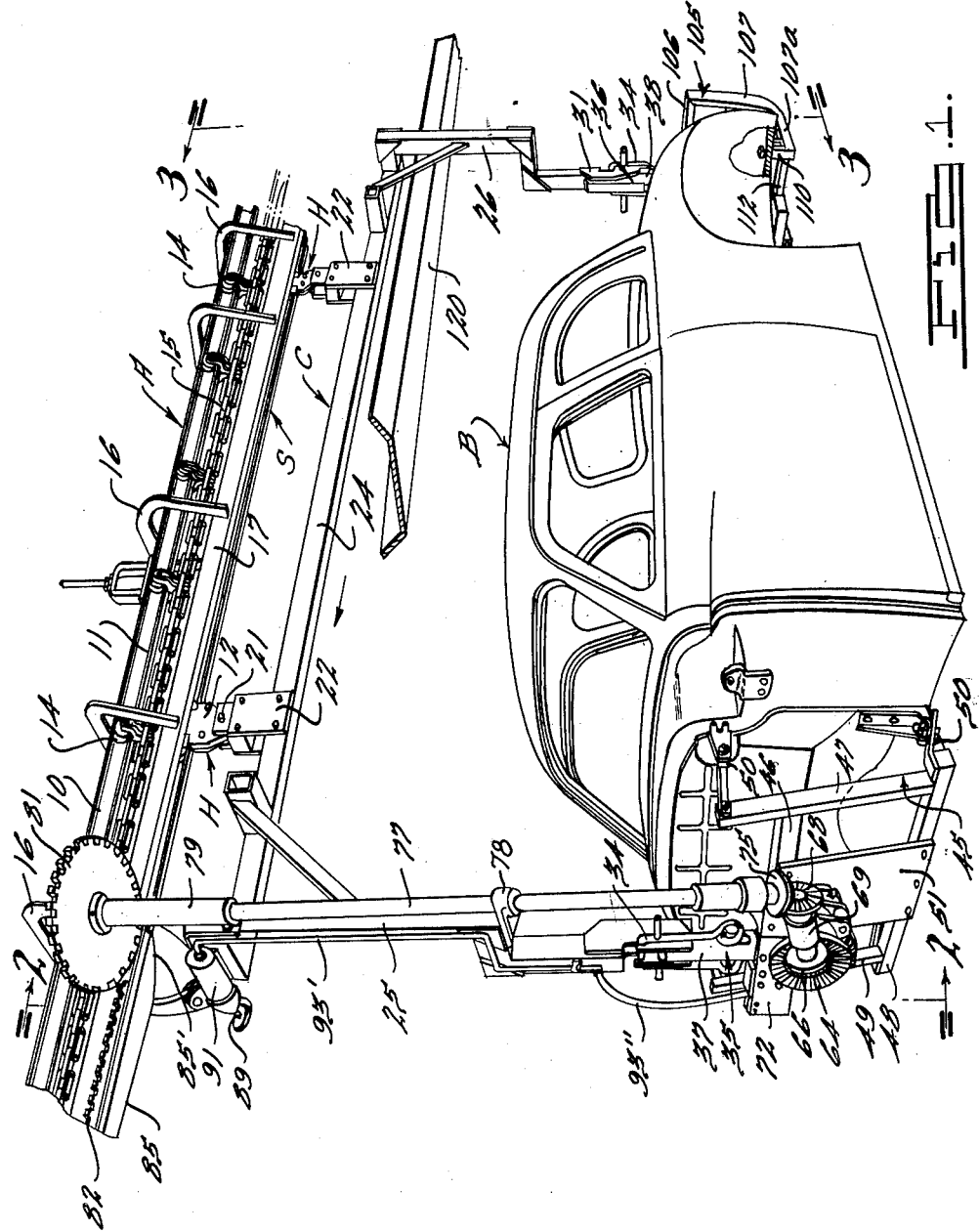
INVENTOR.
John N. Straky.
BY
Harness and Harris
ATTORNEYS.

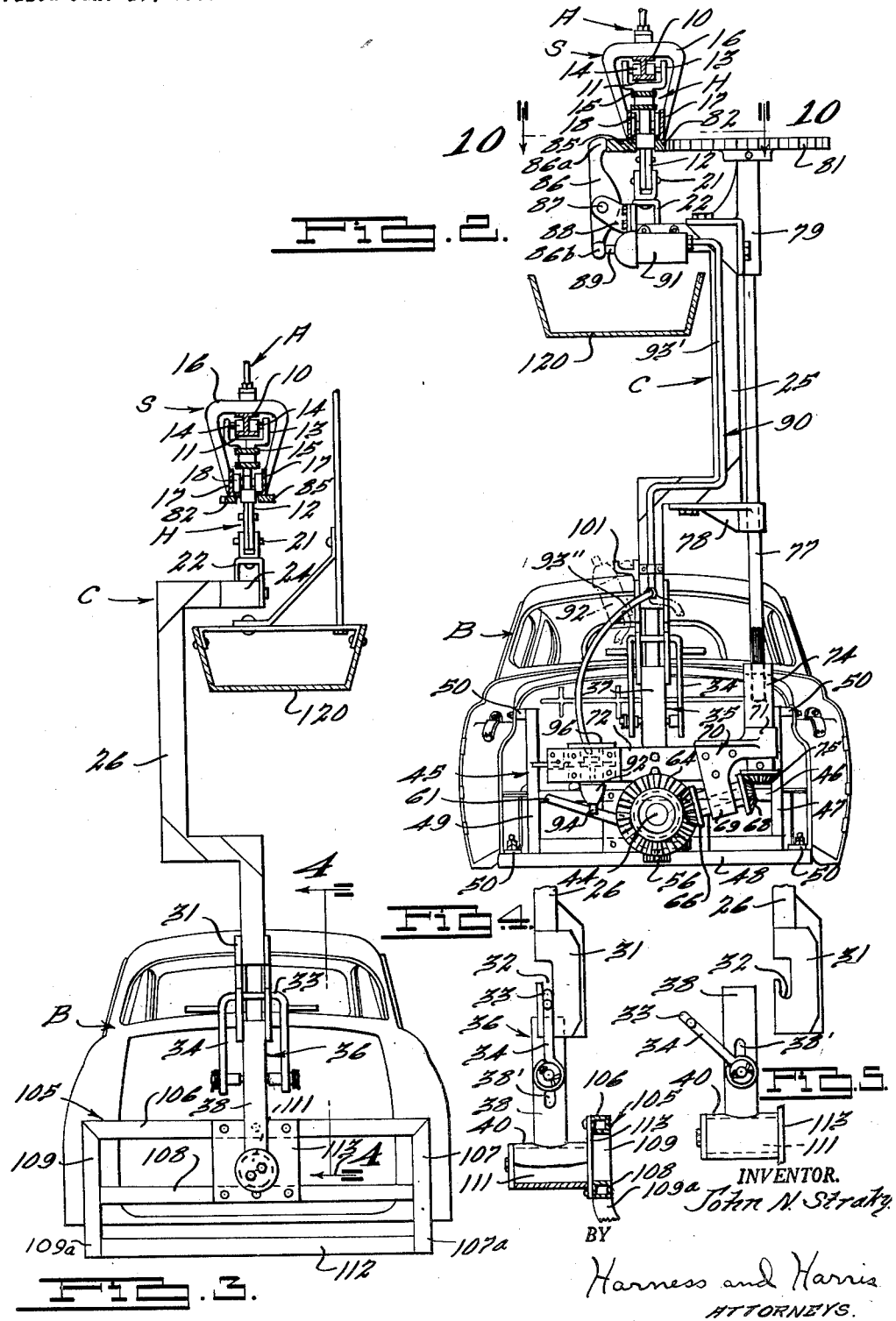

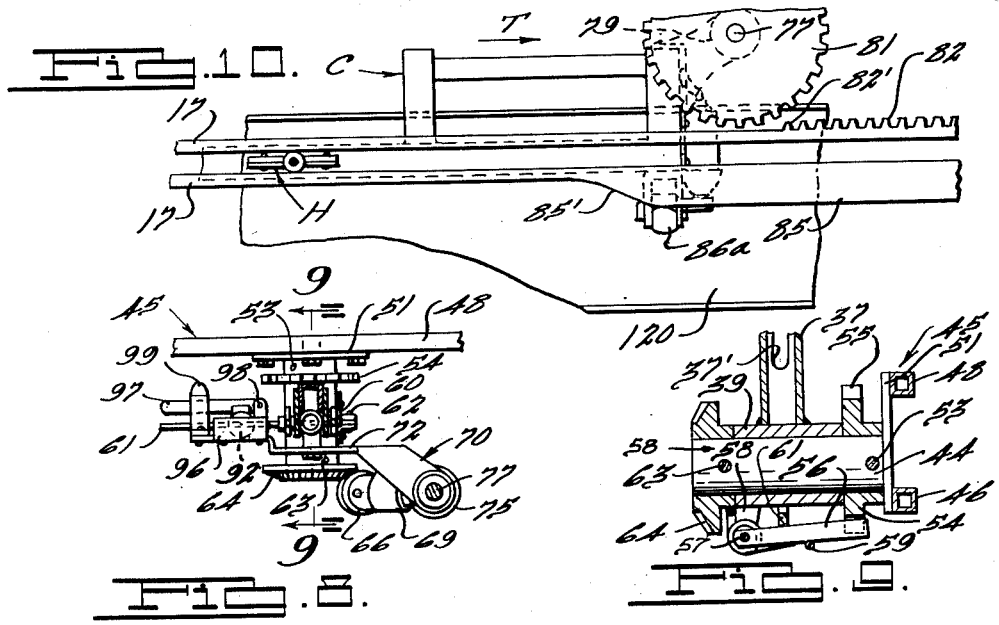
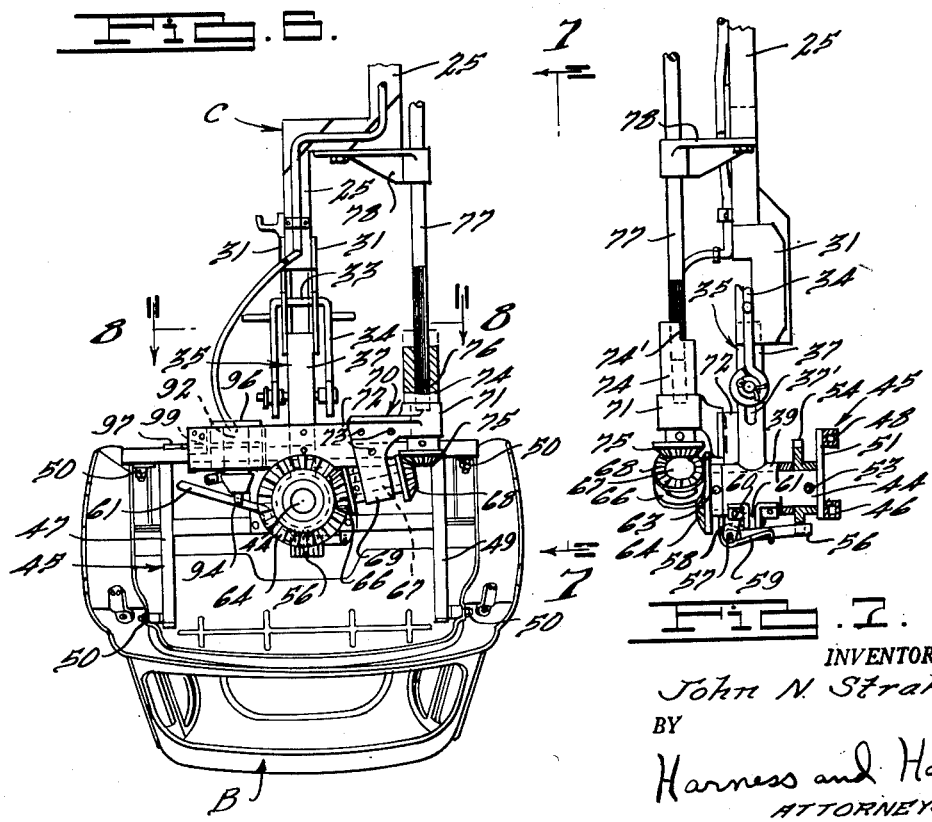

Patented May 11, 1954

2,678,025

UNITED STATES PATENT OFFICE 2,678,025

VEHICLE BODY HANDLING EQUIPMENT

John N. Straky, Detroit, Mich., assignor to Chrysler Corporation, Highland Park, Mich., a corporation of Delaware Application June 15, 1950, Serial No. 168,329

8 Claims. (Cl. 118—500)

This invention has to do with the spray coating of objects such as motor vehicle bodies an relates specifically to the body carrier equipment for handling the bodies during their passage along the conveyor line where they receive the spray coating.

It is a primary object of this invention to provide material handling equipment that will produce a better quality spray coat job in a shorter period of time and at a reduced cost from both a labor and material standpoint. While this invention may be embodied in machines for uses other than the spray painting of motor vehicle bodies, still, it is specifically designed for large scale spray painting of motor vehicle bodies or other large sized objects that are relatively difficult to handle in such a manner that substantially all exteriorly disposed portions thereof may be easily and satisfactorily spray coated by either automatically or manually operated paint spray equipment. It is a basic object of this invention to provide material handling equipment that may be readily incorporated in an overhead conveyor type assembly line to provide for automatic rotation of the work material about a selected longitudinally extending axis as the material passes along certain sections of the assembly line.

It is a further object of this invention to provide a simple, easily operable, material handling means to support and rotate the work material as it is passed along certain portions of an assembly line, said equipment restraining rotation of the work material along certain other portions of the assembly line.

It is an additional object of this invention to provide novel means for supporting a motor vehicle body or the like from a single track type of assembly line overhead conveyor whereby movement of the body along the assembly line will automatically effect rotation of the body about one of its longitudinally extending axes while the body is passing along certain portions of the assembly line and will automatically lock the body in a predetermined position while it is passing along other portions of the assembly line.

It is still another object of this invention to provide an improved form of work holder or work carrier including detachably connected carrier attached and work attached units having disconnectible power transmitting connections therebetween.

Other objects and advantages of this invention will become apparent for a reading of the attached description and a consideration of the related drawings wherein:

Fig. 1 is a fragmentary perspective view of a portion of an assembly line overhead conveyor system including a vehicle body carrier embodying this invention;

Fig. 2 is an elevational view, partly in section, taken along the line 2—2 of Fig. 1 looking from in front of the carrier towards the rear thereof;

Fig. 3 is an elevational view, partly in section, taken along the line 3—3 of Fig. 1 looking from behind the rear of the carrier towards the front thereof;

Fig. 4 is a fragmentary elevational view taken along the line 4—4 of Fig. 3 disclosing the detachable connection between the rear trunnion shaft supporting frame and the rear body carrier leg;

Fig. 5 is a fragmentary view similar to Fig. 4 but showing the trunnion shaft supporting frame and the body carrier disconnected;

Fig. 6 is an elevational view, similar to Fig. 2 but showing the vehicle body rotated 180 degrees from the position in Fig. 2;

Fig. 7 is a fragmentary side elevational view taken along the line 7—7 of Fig. 6 disclosing the rotating and locking mechanism associated with the front trunnion shaft supporting frame;

Fig. 8 is a fragmentary sectional elevational view taken along the line 8—8 of Fig. 6 disclosing the body rotating and locking mechanism;

Fig. 9 is an enlarged fragmentary sectional elevational view taken along the line 9—9 of Fig. 8; and Fig. 10 is a fragmentary elevational view taken along the line 10—10 of Fig. 2 disclosing the body rotating and locking connections to the conveyor trackway.

In the drawings, particularly Figs. 1-3, is shown a portion of an overhead conveyor A that has shiftably mounted thereon a body carrier member C that supports a motor vehicle body B.

The overhead conveyor A may be any one of several well known commercial forms, the one herein disclosed including an I-beam type of track 10 having shiftably mounted thereon spaced pairs of body carrier hangers H. Each hanger H includes a plate-like body portion 12 that has a bifurcated upper end portion 13 rotatably mounting a pair of spaced apart rollers 14. Rollers 14 are adapted to seat on and be shifted along the lower flange 11 of the track 10. The hangers 14 are drivingly connected to the endless drive chain 15 so that the hangers H and carrier C may be shifted along the track 10 during movement of the drive chain lengthwise of the track 10.

The track 10 and hangers H have associated therewith the stabilizing structure S which restrains the tendencies of the hangers H to swing transversely about the track 10 in pendulum fashion. The stabilizing structure S includes the inverted substantially U-shaped track supports 16 that are fixedly mounted on the upper flange of the track 10. The depending free ends of the legs of the U-shaped supports 16 each support an L-shaped or inverted T-shaped track section 17. The lower flanges of the spaced track sections 17 provide a trackway for the stabilizing rollers 18 that are rotatably mounted on opposite sides of the hanger body portions 12 so as to roll along the lower flanges of track sections 17. Hangers H are restrained against transverse swinging movement relative to track 10 by engagement with the wall portions of the track sections 17.

Pivotally connected to the lower depending end of each hanger body portion 12 by the bolt means 21 is a yoke-like load supporting bracket 22. The pair of spaced brackets 22 support the beam member 24 of the body carrier member C. Carrier member C includes the longitudinally disposed, horizontally extending beam member 24 and the pair of front and rear, vertically extending, trunnion supporting legs 25 and 26 respectively. The lower end of each trunnion supporting leg 25 and 26 is formed with a C-shaped bracket 31 (see Figs. 2-5). Brackets 31 each provide an opening 32 adapted to receive the bight portion 33 of a pivotally mounted inverted U-shaped load supporting link 34. Load supporting links 34 are pivotally and slidably mounted by means of the pin and slot connections 37' and 38' respectively on the supporting posts 37 and 38 of each of the front and rear trunnion supporting frames 35 and 36 respectively. The pivotally and slidably mounted load supporting links 34 provide a quick, easily operable, detachable connection between the trunnion supporting frames 35 and 36 and the carrier frame legs 25 and 26 respectively.

Each of the trunnion shaft supporting frames 35 and 36 include a vertically extending tubular post portion 37 and 38 respectively and a horizontally extending tubular, trunnion shaft bearing portion 39 and 40 respectively. The arrangement of the post and bearing portions is such as to provide trunnion shaft supporting frames of substantially inverted T-shaped configuration.

The trunnion shaft sleeve type bearing portion 39 (see Figs. 7 and 9) of the front trunnion shaft supporting frame 35 is adapted to journal the trunnion shaft 44 of the front body supporting frame 45. Front body supporting frame 45 is of substantially rectangular configuration and includes connected horizontally and vertically extending frame members 46, 47, 48 and 49. Bolt carrying plate-like connectors 50 are provided at the four corners of the frame 45 to provide means for detachably connecting the frame 45 to the front end of the vehicle body B. A support plate 51 is connected between the frame members 46, 48 to provide a mounting for front trunnion shaft 44.

Front trunnion shaft 44 has drivingly connected thereto by the pin means 53 an annular, plate-like, toothed, locking gear member or brake 54. The tooth slots 55 around the periphery of the member 54 are adapted to be selectively engaged by a pivotally mounted, spring-pressed locking lever 56. Locking lever 56 is pivotally mounted at 57 on the bracket 58 carried by the bearing sleeve portion 39 of the front trunnion supporting frame 35. Spring 59 normally urges the locking lever 56 into engagement with the toothed periphery of the locking plate 54. Also pivotally mounted at 60 on the sleeve bearing portion 39 of the front trunnion shaft supporting frame 35, is actuating lever 61 for the locking lever 56. Counterclockwise or downward movement of actuating lever 61 about its pivot pin 62 will cam the locking lever 56 out of engagement with the tooth slots 55 on locking plate 54 and will permit the trunnion shaft 44 and connected body supporting frame 45 to rotate in bearing 39 about a substantially horizontal axis. The automatically operable means for actuating the lever 61 and effecting rotation of the trunnion shaft 44 will be subsequently described in detail.

Also drivingly mounted on the trunnion shaft 44 by the pin means 63 is a bevel gear element 64. The toothed periphery of gear element 64 is adapted to be engaged by a mating bevel gear element 66. Gear 66 is operably associated with the after described gear means 68, 75, 81, 82 so as to automatically effect rotation of the trunnion shaft carried body supporting frames 45, 105 and the associated vehicle body B as the body carrier member C passes along track 10. Gear 66 is drivingly mounted on one end of a shaft 67 the other end of which has drivingly mounted thereon the bevel gear element 68. Shaft 67 is rotatably supported in a bracket supported bearing 69 that is part of a frame member 70. Frame member 70 is bolted or otherwise fixedly connected to the plate member 72 by the connecting means 73. Plate member 72 is fixedly connected to the post portion 37 of the front trunnion shaft supporting frame 35 by suitable connecting means. The frame member 70 also carries a journal bearing portion 71 that journals the lower portion of the rotatable sleeve 74. The sleeve 74 has a bevel gear 75 drivingly connected to the lower end thereof and positioned so as to mesh with the gear element 68. The upper portion of sleeve 74 has the inner surfaces thereof formed with splineways 76 adapted to be slidably and drivingly engaged by the splined lower end of the drive shaft 77. Drive shaft 77 is rotatably supported on the carrier frame front leg 25 by the carrier frame support brackets 78 and 79.

The upper end of drive shaft 77 has drivingly connected thereto the pinion type gear 81 (see Figs. 1, 2 and 10). Gear 81 is adapted to mesh with rack sections 82 that are located along certain portions of one of the overhead track sections 17. Rack sections 82 are located along those portions of the track where it is desired to have the car body B rotated about the axis of the trunnion shaft 44. Obviously at the sections of the track 17 where the racks 82 are omitted there will be no means for positively effecting rotation of the car body B for the gear 81 will be running free.

As the locking lever 56 is normally engaged with the toothed periphery of the trunnion shaft carried gear element 54, it is necessary to disengage the lever 56 from gear 54 prior to the time the gear 81 engages a rack section 82. Means are herein provided for automatically disengaging lever 56 and gear 54 just prior to engagement of rack and pinion 81 and 82 and to also automatically reengage the lever 56 and gear 54 just after the pinion gear 81 passes off a rack section 82. The means for accomplishing this automatic release and re-engagement of the gear 54 and locking lever 56 comprises a cam track 85 that is carried by the other of the two overhead track sections 17. Cam track 85 is adapted to be engaged by the upper end 86a of the pivotally mounted lever type follower 86 as the carrier frame C passes along the conveyor track 10. Lever follower 86 is pivotally mounted at 87 on a bracket 88 carried by the carrier frame beam member 24. The lower end 86b of the lever 86 is engaged with the plunger rod 89 of an actuating piston (not shown) that is mounted in the cylinder 91 of the closed, pressure fluid system represented in general by the reference numeral 90.

The closed pressure fluid system 90, which is mounted on the carrier member C, comprises the pair of pressure fluid cylinders 91 and 92 that are connected by a conduit means 93' and 93". The conduit section 93' is preferably of rigid tubing or the like and is fixedly mounted on the carrier member leg 25, whereas the conduit section 93", connected to the section 93', is of flexible tubing for a reason that will subsequently become readily apparent. Each of cylinders 91 and 92 include a piston (not shown) and an attached plunger rod. The plunger rod 89 for cylinder 91 has been referred to previously whereas the plunger rod 94 for the cylinder 92 is shown connected to the actuating lever 61 for the locking lever 56. The outer or lower end of plunger rod 94 is of bifurcated formation such that it fits over the edge of the actuating lever 61 and provides a positive yet easily detachable connection thereto. The bifurcated connection between the plunger rod 94 and lever 61 also permits the lever 61 to be grasped at its free end and depressed without movement of the plunger rod 94.

The cylinder 92 is adapted to be detachably connected to the front trunnion shaft supporting frame 35 while the carrier member C is moving along the portions of the assembly line where the rotation of body B is to be automatically controlled. It will be noted that cylinder 92 is shown mounted in a channel-shaped support bracket 96 that is carried by the plate 72 that is fixed to the front trunnion shaft supporting frame 35. Cylinder 92 is held in bracket 96 by the pivotally mounted locking bar 97. Bar 97 is pivotally connected to the bracket 96 at 98. Bar 97 is normally held in the position shown by the leaf spring locking element 99 that engages the free end of bar 97.

When a body B is mounted on a carrier C through the connection of the trunnion shaft supporting frames 35, 36 to the carrier frame legs 25, 26, the cylinder 92 is removed from the hook 101 (see Fig. 2) and inserted in the bracket 96 of frame 35 with the bifurcated end of the plunger rod 94 engaging the lever 61 in the manner shown. Locking bar 97 is then closed against the spring lock 99 and this holds cylinder 92 in bracket 96. The cylinder plunger rod 94 transmits its reaction to the upper flange of the channel-shaped bracket 97 in a manner that is thought to be readily apparent. The cylinders 91 and 92 include suitable spring means or the like (not shown) to return the plunger rods 89 and 94 to their normally inactive positions.

The rear body supporting frame 105 is similar to the front body supporting frame 45 in that it has connected frame member 106, 107, 108 and 109 that provide a substantially rectangularly shaped frame unit that is adapted to be connected to the rear of the vehicle body B and to support the rear trunnion shaft 111. The frame members 107 and 109 are extended and bent into an L-shaped configuration to provide legs 107a and 109a that are provided with bolt carrying plates 110 for detachably connecting the rear body supporting frame 105 to the vehicle body B. The forwardly extending ends of the frame members 107a and 109a may be connected by a frame member 112. Mounted between frame members 106 and 108 of the rear body supporting frame 105 is a plate member 113 that carries the rear trunnion shaft 111. Trunnion shaft 111 is journalled in the sleeve-type bearing portion 46 of the rear trunnion shaft supporting frame 36.

A dirt guard or dirt collector trough 120 may be suspended beneath the overhead track 10 in conventional manner to protect the suspended body B from foreign matter carried by the overhead conveyor equipment.

In utilizing the apparatus herein disclosed, the vehicle body B, which is mounted on a dolly or the like, has the front and rear body supporting frames 45 and 105 respectively bolted to the front and rear ends of the vehicle body B. The body supporting frames 45 and 105 carry the trunnion shaft supporting frames 35 and 36 respectively, therefore, the vehicle body B is then ready to be moved to the loading station of the overhead conveyor system. At the loading station the vehicle body B is moved into position beneath the overhead track 10 and the carrier member C is then moved along the track 10 and the carrier leg members 25, 26 respectively are positioned above the trunnion shaft supporting frames 35 and 36. Load supporting hook members 34 are then swung into engagement with the C-shaped plate clips 31 so as to detachably connect the body B to the leg members 25, 26 of the carrier frame C. At the time the body B is elevated to connect the load supporting hooks 34 to carrier leg supporting clamps 31 the lower end of the rotatable shaft 77 is aligned with and inserted into the splined bore 76 of the rotatable sleeve member 74 that is carried by the front trunnion shaft supporting frame 45. The connection of shaft 77 to sleeve 74 establishes a driving connection between the rotatable pinion member 81 and the gearing 75, 68, 66, 64 of the front trunnion shaft supporting frame 45. At the same time that the drive shaft 77 is connected to the sleeve 74 of front trunnion shaft supporting frame 45, an operator on the other side of the assembly line will disconnect the piston cylinder 92 of the hydraulic system 90 from the hook 101 (shown in broken lines in Fig. 2) and mount the cylinder 92 in the bracket 96 on the front body supporting frame 45 so that plunger rod 94 is engaged with lever 61 to provide for automatic operation of the brake member 54 that is associated with the rotatable trunnion shaft 44 of the front body supporting frame 45. Upon connection of the shaft 77 and the cylinder 92 to the front body supporting frame 45, carrier unit C is conditioned for automatically controlled maneuvering during its passage along the assembly line. As carrier member C passes along the assembly line the cam lever 86 will engage cam sections 85 so as to cause the pressure fluid system 90 to actuate lever 61 and release the brake member 54. Subsequent to release of the brake 54 the pinion 81 will engage the rack 82 and rotate shaft 77 which will cause rotation of the body B about the trunnion shafts 44 and 111 respectively. At sections of the assembly line where rotation of the body B is not desired, the cam way 85 is formed so as to cause cam lever 86 to apply the brake 54. Prior to the point where the brake 54 is applied, the rack section 82 is discontinued so as to break the driving connection between the rack 82 and the pinion 81.

When the carrier C, with its attached body B, has reached the end of its passage through the assembly line, a dolly or the like is connected to the body B and then the body is raised so as to disconnect the load supporting hooks 34 from the C shaped carrier supported clamp members 31. At the time load supporting hooks 34 are disconnected from the clamps 31, the lower fluid pressure cylinder 92 is detached from the bracket 96 of the front body supporting frame 45 and relocated on the hook support 101 of the carrier frame C. Obviously, as the body C is lowered on to its supporting dolly the rotatable shaft 77 will be automatically disconnected from the sleeve member 74. At this point the body B may be moved to its next assembly point and the carrier member C may be returned to the loading station on the assembly line.

From the above it is thought to be obvious that there is herein provided a work carrier unit that includes means to detachably connect a work unit to the carrier unit, means to automatically rotate the work unit as it passes along the assembly line, and means to provide for intermittent rotation and non rotation of the work unit as it passes along various sections of the assembly line. Furthermore, the carrier unit is constructed in such a way that the minimum of manual labor is required to control the rotation of the work unit as it passes along the various sections of the assembly line.

I claim:

1. Apparatus for supporting a body to be rotated while it is passed along a path where it is to be spray coated or the like comprising a conveyor track, longitudinally spaced hanger means suspended from and mounted for longitudinal movement along said track, a rigid body carrier supported by said hanger means having a pair of longitudinally spaced apart, depending legs, a pair of trunnion shaft supporting frames each of which is detachably connected to one leg of said carrier member, and a pair of body supporting frames each of which is connected to one of said trunnion shaft supporting frames and also connectible to said body, said body supporting frames including trunnion shaft means to provide for rotation of the body supporting frames and the connected body about an axis extending longitudinally of the track, motion transmitting means carried by said carrier member and engageable with certain portions of said track and at least one of said trunnion shafts to automatically effect rotation of the trunnion shafts and associated body supporting frames and body as said carrier member is moved longitudinally along said certain portions of said track, and means carried by said carrier member and engageable with certain other portions of said track to lock said trunnion shafts, associated body supporting frames and body against rotation as said carrier member is moved longitudinally along said certain other portions of said track.

2. Apparatus for supporting a motor vehicle body that is to be rotated while it is spray coated or the like comprising a conveyor track, hanger means suspended from and mounted for longitudinal movement along said track, a body carrier member depending from and supported by said hanger means, a pair of trunnion shaft supporting frames adapted to be detachably connected to said carrier member in longitudinally spaced relationship, a body carrying frame having a rotatable trunnion shaft connected to each of said trunnion shaft supporting frames, said trunnion shafts being arranged with respect to the trunnion shaft supporting frames so as to provide for rotation of the body about an axis extending longitudinally of the track, rack type gearing mounted on certain portions of said track, pinion type gearing supported by said carrier member and engageable with said track mounted gearing to transform the relative movement of said carrier member along said track into rotary movement of said carrier supported gearing, and gear means mounted on at least one of said trunnion shafts engageable with said carrier supported gearing to effect rotation of said body and body supporting frames as said carrier member passes along said certain portions of said track, cam means on certain other portions of said track, follower operated means carried by said carrier member and engageable with said cam means, and locking means on at least one of said trunnion shaft supporting frames operable by said follower operated means to anchor said body supporting frames against rotation when said carrier member passes along said certain other portions of said track.

3. Apparatus for supporting a body that is to be rotated as it passes along portions of a conveyor track comprising a rigid carrier member adapted to be shiftably mounted on and to extend longitudinally of the track, said carrier member including a rigid, longitudinally extending beam member and a pair of rigid leg members depending from longitudinally spaced portions of said beam member, a pair of rigid trunnion shaft supporting frames each detachably connected to one of said leg members, a trunnion shaft journal carried by each of said trunnion shaft supporting frames arranged to extend longitudinally of said track, a pair of rigid body supporting frames each provided with a trunnion shaft that is mounted in the journal of a trunnion shaft supporting frame, means carried by said body supporting frames adapted to be detachably connected to a body or the like that is suspended between the body supporting frames, a gear member drivingly mounted on one of said trunnion shafts, gearing carried by one of said trunnion shaft supporting frames meshing with said gear member, a drive shaft rotatably mounted on said carrier member, means adapted to drivingly connect said drive shaft to said gearing, a pinion gear drivingly mounted on said drive shaft, and rack means mounted on said track and engageable with said pinion gear as said carrier moves along said track to automatically effect rotation of said one of said trunnion shafts, and a brake means mounted on one of said trunnion shafts and the associated trunnion shaft supporting frame adapted to be applied to anchor the last mentioned trunnion shaft against rotation, said brake means having means connected thereto and engageable with means spaced longitudinally of said track to provide for automatic operations of the brake means as the body supporting apparatus passes longitudinally along said track.

4. Apparatus for supporting a body that is to be rotated as it passes along portions of a conveyor track comprising a rigid carrier member adapted to be shiftably mounted on and to extend longitudinally of the track, said carrier member including a rigid, longitudinally extending beam member and a pair of rigid leg members depending from longitudinally spaced portions of said beam member, a pair of trunnion shaft supporting frames each detachably connected to one of said leg members, a trunnion shaft journal carried by each of said trunnion shaft supporting frames arranged to extend longitudinally of said track, a pair of body supporting frames each provided with a trunnion shaft that is mounted in the journal of a trunnion shaft supporting frame, means carried by said body supporting frames adapted to be detachably connected to a body or the like suspended between the body supporting frames, a gear member drivingly mounted on one of said trunnion shafts, gearing carried by one of said trunnion shaft supporting frames meshing with said gear member, a drive shaft rotatably mounted on said carrier member, means adapted to drivingly connect said drive shaft to said gearing, a pinion gear drivingly mounted on said drive shaft, and rack means mounted on said track and engageable with said pinion gear as said carrier moves along said track to automatically effect rotation of said one of said trunnion shafts, and a brake means mounted on one of said trunnion shafts and the associated trunnion shaft supporting frame adapted to be applied to anchor the last mentioned trunnion shaft against rotation, said brake means including means automatically actuable by passage of said carrier along said track to effect release and application of said brake means.

5. Apparatus for supporting a body that is to be rotated as it passes along portions of a conveyor track comprising a carrier member adapted to be shiftably mounted on and to extend longitudinally of the track, said carrier member including a longitudinally extending beam member and a pair of leg members depending from longitudinally spaced portions of said beam member, a pair of trunnion shaft supporting frames each adapted to be detachably connected to one of said leg members, a trunnion shaft journal carried by each of said trunnion shaft supporting frames arranged to extend longitudinally of said track, a pair of body supporting frames each provided with a trunnion shaft that is adapted to be mounted in the journal of a trunnion shaft supporting frame, means carried by said body supporting frames adapted to be detachably connected to a body or the like suspended between the body supporting frames, a gear member drivingly mounted on one of said trunnion shafts, gearing carried by one of said trunnion shaft supporting frames meshing with said gear member, a drive shaft rotatably mounted on said carrier member, means adapted to drivingly connect said drive shaft to said gearing, a pinion gear drivingly mounted on said drive shaft, and rack means mounted on said track and engageable with said pinion gear as said carrier moves along said track to effect rotation of said one of said trunnion shafts, and a brake means mounted on one of said trunnion shafts and the associated trunnion shaft supporting frame adapted to be applied to anchor the last mentioned trunnion shafts against rotation, said brake means including means automatically actuable by passage of said carrier along said track to effect release and application of said brake means, the last mentioned means comprising cam means mounted on said track, follower means carried by said carrier member and engageable with said cam means, and motion transmitting means extending between said follower means and said brake means to effect operation of said brake means by said follower means.

6. Apparatus for supporting a body that is to be rotated as it passes along portions of a conveyor track comprising a carrier member adapted to be shiftably mounted on and to extend longitudinally of the track, said carrier member including a longitudinally extending beam member and a pair of leg members depending from longitudinally spaced portions of said beam member, a pair of trunnion shaft supporting frames each adapted to be detachably connected to one of said leg members, a trunnion shaft journal carried by each of said trunnion shaft supporting frames arranged to extend longitudinally of said track, a pair of body supporting frames each provided with a trunnion shaft that is adapted to be mounted in the journal of a trunnion shaft supporting frame, means carried by said body supporting frames adapted to be detachably connected to a body or the like suspended between the body supporting frames, a gear member drivingly mounted on one of said trunnion shafts, gearing carried by one of said trunnion shaft supporting frames meshing with said gear member, a drive shaft rotatably mounted on said carrier member, means adapted to drivingly connect said drive shaft to said gearing, a pinion gear drivingly mounted on said drive shaft, and rack means mounted on said track and engageable with said pinion gear as said carrier moves along said track to effect rotation of said one of said trunnion shafts, and a brake means mounted on one of said trunnion shafts and the associated trunnion shaft supporting frame adapted to be applied to anchor the last mentioned trunnion shafts against rotation, said brake means including means automatically actuable by passage of said carrier along sid track to effect release and application of said brake means, the last mentioned means comprising cam means mounted on said track, follower means carried by said carrier member and engageable with said cam means, and motion transmitting means extending between said follower means and said brake means to effect operation of said brake means by said follower means, said motion transmitting means including a closed pressure fluid system having a first cylinder with a plunger therein operable by said follower means and a second cylinder with a plunger therein connected to said brake means to operate same.

7. Apparatus for supporting a body that is to be rotated as it passes along portions of a conveyor track comprising a rigid carrier member adapted to be shiftably mounted on and to extend longitudinally of the track, said carrier member including a longitudinally extending rigid beam member having integral, rigid, leg members depending from longitudinally spaced portions of said beam member, a rigid trunnion shaft supporting frame detachably connected to each of said carrier leg members, trunnion shaft journals carried by each of said trunnion shaft supporting frames arranged to extend longitudinally of said carrier beam, a rigid body supporting frame connected to each trunnion shaft supporting frame, each body supporting frame being provided with a trunnion shaft that is journaled in the journal of the associated trunion shaft supporting frame, means carried by each of said body supporting frames adapted to be detachably connected to a body or the like that is suspended between the spaced body supporting frames, a gear member drivingly mounted on one of said trunnion shafts, power driven gearing arranged to be meshingly engaged with the trunnion shaft supported gear member as said carrier member moves along said track to automatically effect rotation of said body supporting frames and the body or the like suspended therebetween at preselected positions along said track, and brake means associated with one of said trunnion shafts adapted to control rotation thereof, said brake means including means to effect automatic operation thereof as said body supporting apparatus moves longitudinally along said track.

8. Apparatus for supporting a body that is to be rotated as it passes along portions of a conveyor track comprising a rigid carrier member adapted to be shiftably mounted on and to extend longitudinally of the track, said carrier member including a longitudinally extending beam member and leg members depending from longitudinally spaced portions of said beam member, a trunnion shaft supporting frame detachably connected to each of said carrier leg members, trunnion shaft journals carried by each of said trunnion shaft supporting frames arranged to extend longitudinally of said carrier beam, a body supporting frame connected to each trunnion shaft supporting frame, each body supporting frame being provided with a trunnion shaft that is journaled in the journal of the associated trunnion shaft supporting frame, means carried by each of said body supporting frames adapted to be detachably connected to a body or the like that is suspended between the body supporting frames, a gear member drivingly mounted on one of said trunnion shafts, power driven gearing arranged to be meshingly engaged with the trunnion shaft supported gear member as said carrier member moves along said track to automatically effect rotation of said body supporting frames and the body or the like suspended therebetween, and brake means associated with one of said trunnion shafts adapted to control rotation thereof, and power operated means controlled by the passage of said carrier member along said track to automatically apply and release said brake means.

References Cited in the file of this patent

UNITED STATES PATENTS

| Number | Name | Date |
|---|---|---|
| 1,280,992 | Hamilton | Oct. 8, 1918 |
| 2,354,124 | James | July 18, 1944 |
| 2,383,503 | Landis et al. | Aug. 28, 1945 |
| 2,471,347 | Rayburn | May 24, 1949 |
| 2,474,984 | Pioch | July 5, 1949 |
| 2,597,914 | Whitworth et al. | May 27, 1952 |
| 2,598,163 | Halls | May 27, 1952 |
| 2,598,201 | Williams et al. | May 27, 1952 |
| 2,598,246 | Fowler | May 27, 1952 |